United States Patent [19]

Kraft et al.

[11] Patent Number: 4,894,838
[45] Date of Patent: Jan. 16, 1990

[54] ELECTRON BEAM PREIONIZATION OF A HIGH PRESSURE SELF-SUSTAINING GAS LASER

[76] Inventors: Robert Kraft, 79 Glenmere Cir., Reading, Mass. 01867; Victor H. Hasson, 12 Madison Ave., West, Winchester, Mass. 01890

[21] Appl. No.: 259,687
[22] Filed: Oct. 19, 1988
[51] Int. Cl.$^4$ .............................................. H01S 3/03
[52] U.S. Cl. ........................................ 372/86; 372/74; 372/83; 372/85
[58] Field of Search ...................... 372/86, 74, 85, 83, 372/87, 59

[56] References Cited

U.S. PATENT DOCUMENTS

| | | | |
|---|---|---|---|
| 3,641,454 | 2/1972 | Krawetz | 331/94.5 |
| 3,789,321 | 1/1974 | Krawetz et al. | 372/74 |
| 3,818,375 | 6/1974 | Stapleton et al. | 331/94.5 |
| 3,828,274 | 8/1974 | Krawetz | 331/94.5 |
| 3,962,656 | 6/1976 | Peressini | 331/94.5 |
| 3,970,962 | 7/1976 | Peressini et al. | 331/94.5 |
| 4,071,806 | 1/1978 | List | 372/86 |
| 4,088,965 | 5/1978 | Lauderslager et al. | 331/94.5 |
| 4,180,784 | 12/1979 | Nelson et al. | 331/94.5 PE |
| 4,196,399 | 4/1980 | Cason et al. | 331/94.5 G |
| 4,203,078 | 5/1980 | Daugherty et al. | 372/86 |
| 4,211,983 | 7/1980 | Daugherty et al. | 331/94.5 |
| 4,230,994 | 10/1980 | Bradley | 331/94.5 |
| 4,262,267 | 4/1981 | Schimitschek et al. | 372/86 |
| 4,414,671 | 11/1983 | Wells, Jr. et al. | 372/73 |
| 4,709,373 | 11/1987 | Scott et al. | 372/86 |
| 4,748,635 | 5/1988 | McLellan | 372/86 |
| 4,813,053 | 3/1989 | Fisher et al. | 372/86 |

OTHER PUBLICATIONS

Kline et al.; "Preionized Self-Sustained Laser Discharge"; Applied Atomic Collision Physics, vol. 3; 1982; pp. 389–399.
Ahlstrom et al.; "Results—Discharge in $CO_2$", IEEE J. of Quan. Elec., vol. QE-10, No. 1; 01/1974; pp. 26–29.

Primary Examiner—William L. Sikes
Assistant Examiner—Xuan Thi Vo

[57] ABSTRACT

A high pressure self-sustained gas laser operating at a high specific energy loading and long pulselength. The laser comprises an endless duct for circulating a laser generating gaseous medium and two discharge electrodes for exciting the molecules of the gaseous medium. Behind the discharge cathode electrode is an electron-beam transmitter for transmitting a beam of preionizing electrons into the gaseous medium to preionize the region near the cathode discharge electrode. The region unpreionized by the electron beam is ionized by drifting electrons from the cathode region and avalanche ionization. The applied discharge voltage never exceeds the glow voltage allowing low discharge flush factors under repetitive operation with flowing laser gas.

8 Claims, 2 Drawing Sheets

ELECTRON BEAM PREIONIZATION OF A HIGH PRESSURE SELF-SUSTAINING GAS LASER

DEDICATORY CLAUSE

The invention described herein was made in the course of or under a contract or subcontract thereunder with the Government and may be manufactured, used, and licensed by or for the Government for governmental purposes without the payment to us of any royalties thereon.

BACKGROUND OF THE INVENTION

This invention relates to a self-sustained glow discharge gas laser which is preionized by a short-pulse electron beam.

The advent of TEA (transversely excited atmospheric) lasers around 1969 led to the rapid development and better understanding of the self-sustained, high pressure glow discharges that pump these lasers. The key factor in applying a self-sustained discharge to laser pumping is the ability to maintain electric conduction in a volumetrically diffuse or "glow discharge" mode. This is a condition that provides efficient laser pumping for many gaseous laser systems. Laser transitions are available at discrete frequencies spanning the range from the ultraviolet to the far infrared. Notable examples include electronic transitions of the rare-gas halide excimers (e.g., KrF, XeCl, XeF) in the ultraviolet, electronic transitions of the metal halides (e.g., HgBr, HgCl) in the visible, and vibrational transitions of molecules (e.g., HF, CO, $CO_2$) in the infrared.

In recent TEA laser research, emphasis has shifted to the study of the glow mode of the discharge that is necessary for effective laser pumping. This research has been aimed an increasing the output energy and/or output power of these lasers and increasing their electrical-to-optical energy conversion efficiency.

The requirement for a diffuse glow discharge arises because molecules in the upper laser level are produced by electron collisions. Consequently, the electrons must be much hotter than the gas molecules in order to produce a population inversion. A diffuse glow discharge provides precisely these conditions.

The energy and power of TEA lasers scale with the laser discharge volume and the laser gas pressure. At a given output power level the laser energy can be increased by stretching the laser pulselength. However, attempts to scale up these parameters have been hindered by the tendency for arc formation at high gas pressure. When a filamentary arc forms, the discharge voltage tends to collapse because the arc mode is typically much more conductive than the glow mode. Even if the voltage does not collapse when the arc forms, laser pumping tends to stop because the discharge input energy is channeled into the arc where the electron and gas temperatures rapidly equilibrate. Arcing also destroys the optical quality of the laser medium and can damage system components.

A typical high pressure gas laser consists of a pre-ionization source, two discharge electrodes, and a discharge power supply. Two basic types of preionizers which have been used are ultraviolet radiation where the photon energy is comparable to the ionization potential for the common gases (i.e., 10–25 eV) and sources of high energy radiation where the photon or particle energy is on the order of 0.1–1 MeV. Two common ultraviolet radiation sources are corona discharges and spark discharges. High energy radiation including particles, neutrons, high energy electrons, and x-rays, is used to preionize the gaseous medium of gaseous lasers. If the initial preionized electron density is low, a method of "overvoltage" avalanche ionization is required for self-sustained operation. If a strong preionization source (an electron beam for example) is utilized, the initial preionized electron density can be high enough to eliminate the need for "overvoltage" avalanche ionization.

An attempt has been made to utilize the electron-beam generators as a preionization source. This use was suggested by Levatter and Bradford in 1978 and was used by Bychkov et al in 1979 as an approach to the volume scaling of self-sustained discharge pumped rare-gas halide lasers. However, the electron beams were reported to have the disadvantage, when used as a preionization source, of tending to produce an ionization density that is spatially nonuniform. Nonuniform preionization in the direction transverse to the applied field in a nonuniform self-sustained discharge produces a spatially nonuniform self-sustained discharge that is not well suited for laser pumping (this attempt is reported in Applied Atomic Collision Physics, Volume 3: Gas Lasers, edited by E. W. McDaniel and William L. Nighan, published in 1982 by Academic Press, a subsidiary of Harcourt Brace Jovanovich in New York, pages 396 and 397.)

SUMMARY OF THE INVENTION

It is an object of this invention to provide a high pressure self-sustained gas laser which operates at high specific energy loading and long pulselength which is pre-ionized without the discharge voltage exceeding the glow voltage.

It is a further object of the invention to provide a high pressure self-sustained gas laser operating at high specific energy loading and long pulselength which is pre-ionized by an electron-beam transmitter transmitting electrons through one of the discharge electrodes.

These objects are achieved by utilizing a short-pulse electron beam transmitted through a metalline foil such as a 1-mil Kapton foil with metal deposits on it (which separates the evacuated electron beam transmitter from the high pressure discharge chamber) and then through a steel screen in the discharge cathode electrode. The electron beam transmitter utilizes an 80 ohm, E-type pulseforming network with a full width half maximum pulselength of approximately 1.5 microseconds. The electron beam parameters just through the steel screen are 25 kilo-electron volts energy and 150 milliamperes per square centimeter current density.

The low energy electron beam (the electron range is approximately one third of the discharge anode to cathode spacing) preionizes laser generating gaseous medium predominately near the discharge cathode. During the electron beam pulse, voltage is applied to the discharge electrodes (the voltage risetime is less than the electron beam pulselength) thereby drifting electrons from the heavily preionized cathode region. The electric field is low near the discharge cathode and is concentrated in the unpreionized two thirds of the discharge. The combination of electron drift and avalanche ionization of the unpreionized discharge region results in a uniform electron density throughout the discharge volume suitable for self-sustained operation. Since only two thirds of the discharge undergoes overvoltage avalanche ionization, the applied voltage never exceed the glow voltage (7–12 kilovolts/centimeter - atmosphere). By not exceeding the glow voltage, the likelihood of arcing into the downstream plasma from the previous discharge (under repetitive operation) is reduced. Discharge flush factors as low as 1.25 have been attained at high repetition rates.

As used herein the term "discharge flush factor" is the distance downstream of the laser electrode that the previously excited (discharge) laser gaseous medium flows or moves before the laser gaseous medium is discharged again in a repetitively pulsed gaseous laser. The "flush factor" is the number of times the discharge volume is flushed with the laser gaseous medium between the pulses. The discharge region is flushed to remove any residual, conductive plasma from between the electrodes. If this plasma is not removed, the current may flow through the plasma instead of the intended region. Since the applied voltage never exceeds the glow voltage with the e-beam preionization technique, the likelihood of the current flowing through the residual plasma is reduced and the discharge region does not need to be flushed as often between pulses, that is the flush factor is low.

The flush factor is calculated as follows:

Flush factor = gas velocity × time between pulses/discharge height

Since the electron beam is continually supplying electrons to the cathode region at the same rate they are drifting towards the discharge anode, discharge non-uniformities due to local electric field enhancement (electron space charge depletion) is avoided. The electron beam duration is long enough to allow secondary electron emission processes (ion backbombardment, field emission thermionic emission, photoemission) to establish themselves at the cathode.

BRIEF DESCRIPTION OF THE DRAWINGS

An embodiment of the invention will now be described in connection with the appended drawings, in which.

DETAILED DESCRIPTION OF THE DRAWINGS

Figure 1:
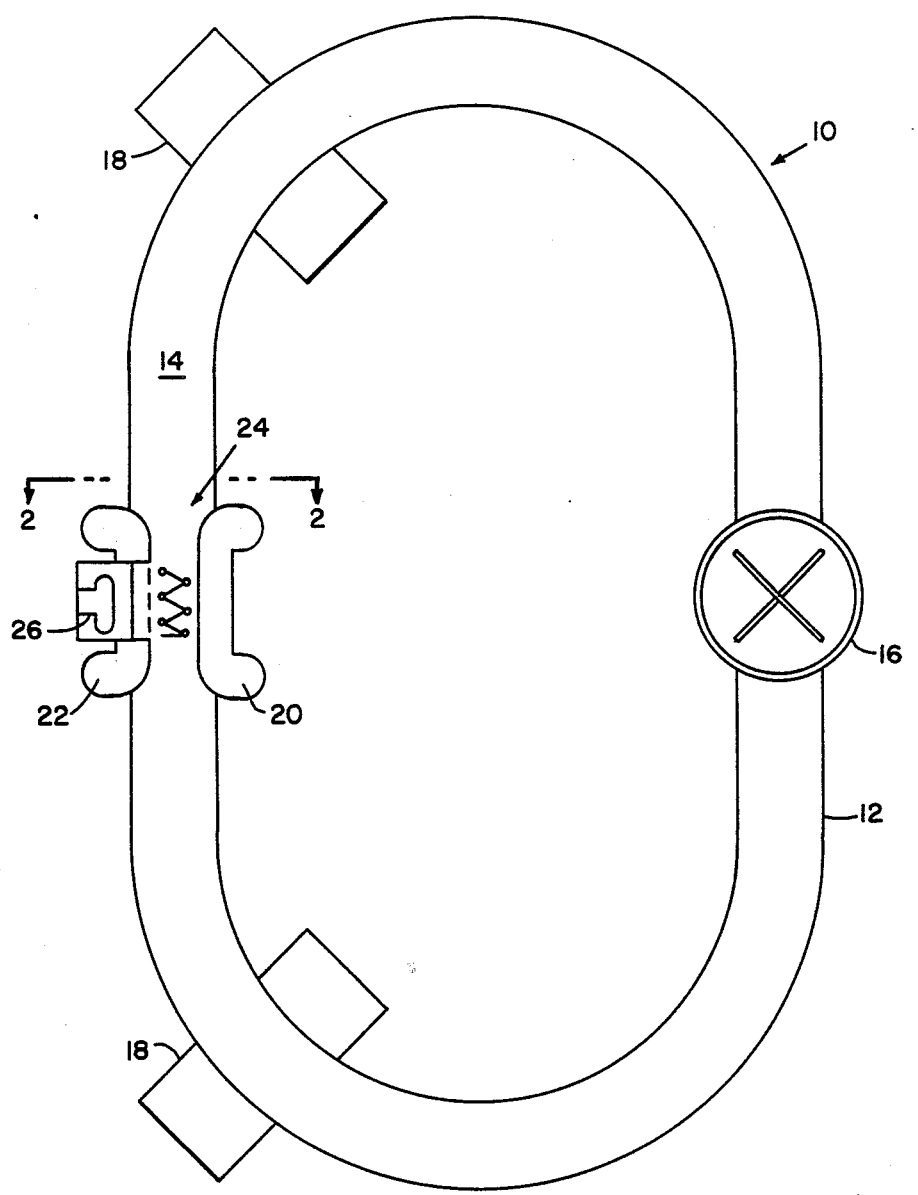
FIG. 1 is a schematic side view of the laser in accordance with the invention.
Figure 2:
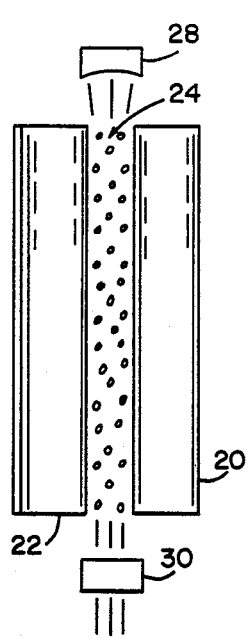
FIG. 2 is a schematic plan view of the discharge electrodes taken along line 2—2 of FIG. 1, with the walls of the gas circulating duct omitted for sake of clarity.
Figure 3:
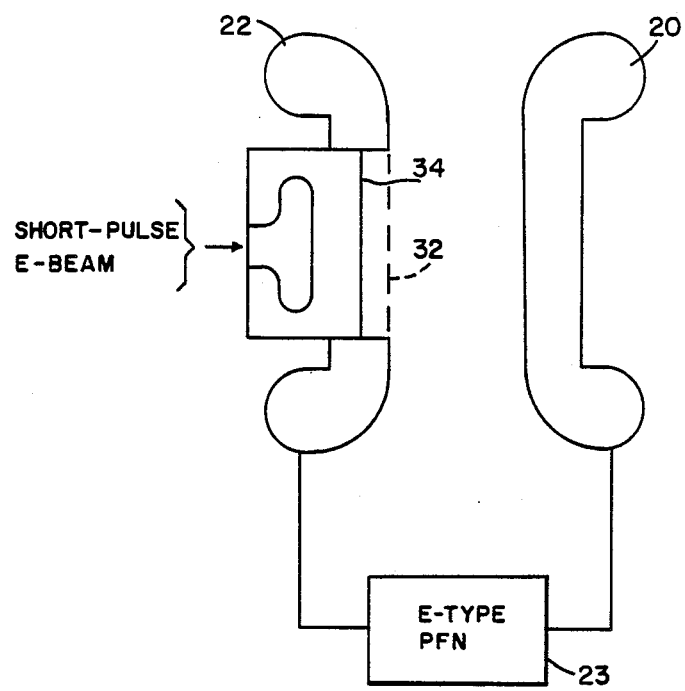
FIG. 3 is an enlarged side view of the discharge electrodes illustrated in FIG. 1; an FIGS. 4 and 5 illustrate typical discharge wave forms in accordance with the invention.

Referring now to FIGS. 1, 2 and 3 of the drawings wherein a high pressure self-sustained gas laser 10 is illustrated. Gas laser 10 comprises an endless duct 12 for circulating a gaseous medium 14. A blower or turbine 16 is disposed within duct 12 for circulating the gaseous medium through the endless duct 12.

Disposed adjacent the circulating duct 12 is a plurality of heat exchangers 18 for cooling the gaseous medium before it is transmitted to discharge electrodes 20 and 22.

The discharge electrodes comprise an anode electrode 20 and a cathode electrode 22. An exited laser gas volume area is created between the surfaces of the anode 20 and the cathode 22 by a discharge pulse forming network 23 which is perpendicular to the gas flow or the upward direction as seen in FIG. 1, and to the optical axis which flows out of the paper in FIG. 1, and which is best seen with respect to the electrode disposition in FIG. 2.

As illustrated, the cathode 22 comprises a stainless steel screen 32 and a metalized foil 34 such as a 1 mil Kapton foil with metal deposits on it. The electron beam transmitter 26 transmits its electrons through the foil 34 and screen 32 into the glow discharge area 24. The electron beam transmitted by transmitter 26 excites the molecules of the gaseous medium 14 to preionize the gaseous medium prior to the pumping by the discharge electrodes 20 and 22 by pulse forming network 23.

The laser beam generated in the glow discharge area is reflected by a full mirror 28 to an 80 percent partial mirror 30, that is, 80 percent of the light energy striking partial mirror 30 is reflected back to mirror 28, the other 20 percent of the energy beam is transmitted through partial mirror 30 as the laser discharge beam.

In operation, the gaseous medium 14 is heated in the discharge area 24. As it circulates through endless duct 12 after leaving glow voltage area 24, the gaseous medium is drawn through duct 12, past the heat exchangers 18 by blower or turbine 16, and returned to the other side of the glow discharge area 24 where its molecules are again excited by the discharge electrodes 20 and 22. The electron beam transmitter 26 is only utilized during the start-up of the laser to preionize the gaseous medium to quickly bring it up to the glow voltage level. The parallel sections of the discharge electrodes are carefully selected for maximum laser discharge energy loading.

In using the laser of the invention, a self-sustained glow discharge is generated using cathode region preionization with a short-pulse electron beam. The combination of electron drift and avalanche ionization of the unpreionized region results in a uniform electron density throughout the discharge volume. Subsequent excitation of the gaseous medium at the glow voltage areas results in a stable self-sustained discharge for periods of at least 25 microseconds.

Figure 4:
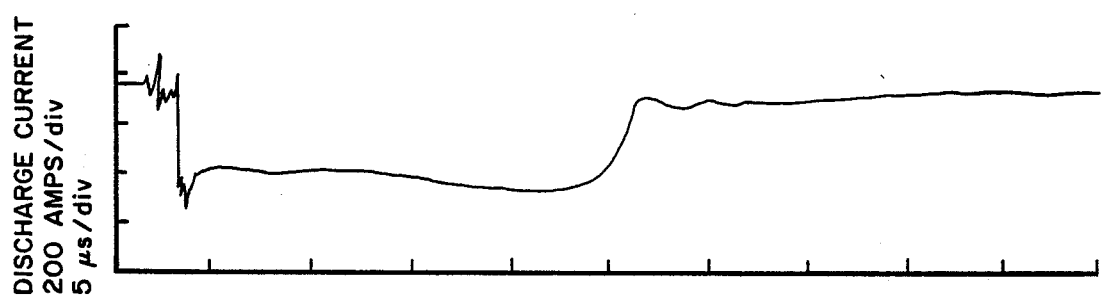
Figure 5:
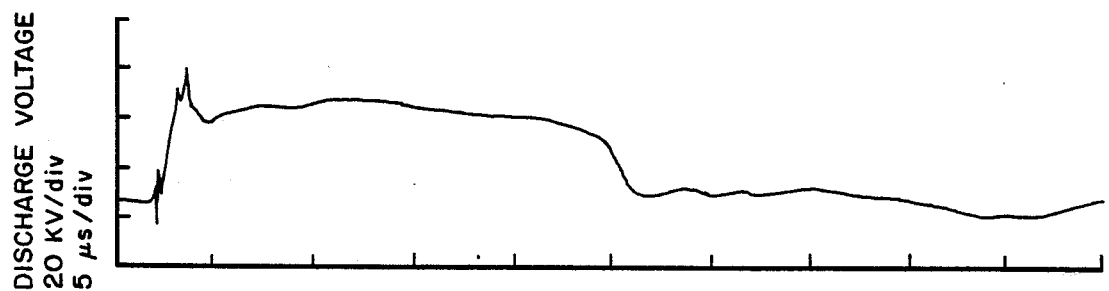

Typical discharge wave forms are shown in FIGS. 4 and 5. The discharge voltage is brought up to the glow voltage for the gaseous medium being used in approximately 200 nanoseconds. The electron beam is injected during the discharge voltage risetime. The discharge voltage and the current remains constant for the 25 microsecond self-sustained discharge pulselength.

Typical electron beam parameters have 25 kilo-electron volts of energy and an injected current density of a 150 milliamps per square centimeter. The glow voltages range from 7–12 kilovolts/cm-atm, depending on the gaseous medium. The discharge height is approximately 7 cm, the spacing between anode and the cathode is 7–9 cm, (volume of approximately 2 liters), and the edges of the discharge are defined by the electron beam preionization profile. In high helium content mixtures (8:2:1, $He:N_2:CO_2$, 1 atm) loading levels of 115 J/l-atm are obtained for the 25 microsecond pulselength. With low helium content mixtures (3:2:1,1.3:6:1, atm) loading levels of 250 J/l-atm are attained for the 25 microsecond pulselength.

High pressure (1 atm) self-sustained glow discharges with $CO_2$ lasing mixtures may be lased at high specific energy loading levels of 250 J/l-atm and long pulselengths (approximately 25 microseconds) by the transverse injection and preionization with a pulsed broad area electron beam.

I claim:

1. In a high pressure self-sustained laser having a gaseous medium, an endless duct for containing said gaseous medium, heat exchangers disposed adjacent said duct for cooling said gaseous medium, and blower means disposed to circulate said gaseous medium through said duct, the improvement comprising:

(a) electrode means comprising an anode and a cathode disposed parallel to each other within opposite walls of said duct for exciting the atoms and molecules of said gaseous medium to cause it to lase and to generate a laser beam along an optical axis; and (b) an electron beam transfer disposed adjacent one of said electrodes outside of said duct for transmitting a short-pulse electron beam perpendicularly through one of said electrodes to preionize the gaseous medium between said electrodes, said electron beam also being transmitted perpendicularly to said optical axis of the laser beam generated by said laser.

2. A gas laser as set forth in claim 1, wherein said electron beam is transmitted through said cathode.

3. A gas laser as set forth in claim 1, wherein the electrode through which said electron beam is transmitted comprises a stainless steel screen and a 1 mil Kapton foil.

4. A gas laser as set forth in claim 1, wherein said gaseous medium comprises $CO_2$.

5. A high pressure self-sustained gas laser, operating at a high specific energy loading, with long pulse length, and a low discharge flush factor, comprising:

(a) an endless duct for containing a laser generating gaseous medium;

(b) heat exchangers disposed about a portion of said endless duct for cooling a gaseous medium contained within said duct;

(c) blower means connected to said duct for moving and circulating a gaseous medium through said duct;

(d) electrode means comprising an anode and a cathode, disposed parallel to each other within opposite walls of said duct for exciting the atoms and the modules of a gaseous medium passing between said anodes and cathode electrodes to cause it to lase;

(e) a pulse forming network connected to said electrodes for periodically exciting the atoms and the modules of a gaseous medium passing between said electrodes;

(f) an electron beam transmitter disposed adjacent one of said electrodes for transmitting a short-pulse electron beam perpendicularly through said electrode to preionize the gaseous medium between said electrodes;

(g) a full mirror disposed adjacent one edge of said electrodes for reflecting all of the light energy striking said mirror along an optical axis which is transverse of said endless duct and parallel to said electrodes; and a second partial mirror disposed adjacent the other edge of said electrodes in the path of the optical beam reflected by said full mirror whereby a portion of said energy beam is transmitted through said parallel mirror as a laser beam.

6. A gas laser as set forth in claim 5, wherein said electron beam is transmitted through said cathode.

7. A gas laser as set forth in claim 5, wherein said electrode through which said electron beam is transmitted comprises a stainless steel screen and a one mil Kapton foil.

8. A gas laser as set forth in claim 5, wherein said gaseous medium comprises $CO_2$.

* * * * *

UNITED STATES PATENT AND TRADEMARK OFFICE
CERTIFICATE OF CORRECTION

PATENT NO. : 4,894,838

DATED : January 16, 1990

INVENTOR(S) : Robert Kraft and Victor H. Hasson

It is certified that error appears in the above-identified patent and that said Letters Patent is hereby corrected as shown below:

Column 2, line 56: before "laser" insert - - a - -.

Column 5, line 17: "transfer" should be - - transmitter - -.

Column 6, line 30: "parallel" should be - - partial - - -.

Signed and Sealed this

Twelfth Day of February, 1991

*Attest:*

HARRY F. MANBECK, JR.

*Attesting Officer*     *Commissioner of Patents and Trademarks*